(12) United States Patent
Calippe et al.

(10) Patent No.: US 8,041,811 B2
(45) Date of Patent: Oct. 18, 2011

(54) MULTI-CHASSIS COMPONENT CORRECTOR AND ASSOCIATOR ENGINE

(75) Inventors: Joël R. Calippe, Sunnyvale, CA (US); Ashok Sadaivan, Sunnyvale, CA (US); Claudio A. Ortega, Redwood City, CA (US)

(73) Assignee: Alcatel Lucent, Paris (FR)

( * ) Notice: Subject to any disclaimer, the term of this patent is extended or adjusted under 35 U.S.C. 154(b) by 185 days.

(21) Appl. No.: 12/427,539

(22) Filed: Apr. 21, 2009

(65) Prior Publication Data

US 2010/0268807 A1    Oct. 21, 2010

(51) Int. Cl.
*G06F 15/173*    (2006.01)
(52) U.S. Cl. ........................................ 709/224; 715/736
(58) Field of Classification Search ................... 709/224
See application file for complete search history.

(56) References Cited

U.S. PATENT DOCUMENTS

| | | | | |
|---|---|---|---|---|
| 5,835,720 | A * | 11/1998 | Nelson et al. ................. | 709/224 |
| 2001/0002914 | A1 * | 6/2001 | Aramoto ........................ | 370/535 |
| 2007/0097992 | A1 * | 5/2007 | Singh et al. ............. | 370/395.54 |
| 2008/0205391 | A1 * | 8/2008 | Suryaputra et al. ........... | 370/389 |

OTHER PUBLICATIONS

Moy, J. OSPF Version 2. Ascend Communications. Apr. 1998.*
Alcatel-Lucent. Guaranteeing Service Delivery by Extending Network Resiliency Enabling Service Providers to Extend High Resiliency from the Node to the Network. 2008.*
Alcatel-Lucent 7750 and 7710 Service Router, Any Service Over Any Port Media Dependent Adapter (MDA), Data Sheet, pp. 1-6.

* cited by examiner

*Primary Examiner* — Andrew Caldwell
*Assistant Examiner* — Bryan Lee
(74) *Attorney, Agent, or Firm* — Kramer & Amado P.C.

(57) ABSTRACT

Various exemplary embodiments relate to a network management system (NMS) and a method performed on the NMS including one or more of the following: receiving a notification of a new endpoint discovered in the network, the new endpoint representing an endpoint in a multi-chassis pair; determining that an address of the new endpoint conflicts with an address of a first existing endpoint of an existing multi-chassis pair, wherein the first existing endpoint is currently paired with a second existing endpoint; determining whether the new endpoint or the first existing endpoint is a proper endpoint of the existing multi-chassis pair; and when the new endpoint is the proper endpoint of the existing multi-chassis pair, updating the data representing the topology in the storage module to replace the first existing endpoint with the new endpoint as paired with the second existing endpoint.

20 Claims, 4 Drawing Sheets

MULTI-CHASSIS COMPONENT CORRECTOR AND ASSOCIATOR ENGINE

TECHNICAL FIELD

Embodiments disclosed herein relate generally to network management systems and, more particularly, to ensuring accurate discovery of network topology by such systems.

BACKGROUND

Customers of modern telecommunications service providers have high expectations regarding the quality of service offered by the providers. From large corporations to individual end-users, every customer desires high transmission speeds. Furthermore, many of the same customers demand highly-available systems in which downtime is minimized or, in many cases, completely eliminated. To ensure customer satisfaction and to keep up with competitors, service providers operate massive networks with countless pieces of equipment. Predictably, as the complexity of the networks has increased, the complexity of maintaining the networks in working condition has also increased.

To aid service providers in providing a high quality of service while minimizing downtime, many equipment manufacturers offer network management systems (NMS). A typical NMS enables network operators to monitor the status of elements in the network and quickly isolate and solve problems that may arise. By gathering information regarding each of the elements in the network, the NMS may build a database detailing the topology of the network and providing information about its status. Thus, an NMS is essentially a third-party observer that collects information to obtain an accurate view of the arrangement and status of the network.

Many service providers implement advanced infrastructures that make it challenging for the NMS to maintain an accurate representation of the network. As an example, many service providers have begun to implement multi-chassis interfaces, in which the service provider utilizes redundant network nodes. Such an arrangement ensures high availability, even in the event of a failure of an entire node. In particular, upon failure of a primary node, a secondary node attached to the primary node resumes operation, such that there is little to no downtime.

As should be apparent from this description, however, the arrangement of nodes in such a multi-chassis interface becomes more complex. Current discovery mechanisms implemented by an NMS fail to properly associate the redundant nodes with one another. In particular, an NMS may incorrectly associate an endpoint belonging to a given multi-chassis interface with an endpoint belonging to a different multi-chassis interface. Thus, in many situations, the NMS may provide the operator with a view of the network that differs from the actual arrangement of the network. In addition to providing erroneous information, this makes it difficult for the operator of the NMS to isolate and correct faults in the network when a failed element is a member of a multi-chassis interface represented incorrectly.

In view of the foregoing, it would be desirable to implement functionality in a network management system that would allow the system to maintain an accurate representation of the topology of the network. In particular, it would be desirable to enable the network management system to accurately reflect the status and connectivity of multi-chassis interfaces in the network. Other desirable aspects will be apparent to those of skill in the art upon reading and understanding the present specification.

SUMMARY

In light of the present need for a network management system that accurately reflects the status and connectivity of multi-chassis interfaces in the network, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a network management system (NMS) and a method performed on the NMS including one or more of the following: receiving a notification of a new endpoint discovered in the network, the new endpoint representing an endpoint in a multi-chassis pair; determining that an address of the new endpoint conflicts with an address of a first existing endpoint of an existing multi-chassis pair, wherein the first existing endpoint is currently paired with a second existing endpoint; determining whether the new endpoint or the first existing endpoint is a proper endpoint of the existing multi-chassis pair; and when the new endpoint is the proper endpoint of the existing multi-chassis pair, updating the data representing the topology in the storage module to replace the first existing endpoint with the new endpoint as paired with the second existing endpoint.

It should be apparent that, in this manner, various exemplary embodiments allow the network management system to maintain an accurate view of the network. In particular, the network management system may accurately reflect the topology of the network, even when the network includes multi-chassis endpoints with conflicting addresses.

BRIEF DESCRIPTION OF THE DRAWINGS

In order to better understand various exemplary embodiments, reference is made to the accompanying drawings, wherein.

DETAILED DESCRIPTION

Referring now to the drawings, in which like numerals refer to like components or steps, there are disclosed broad aspects of various exemplary embodiments.

Figure 1:
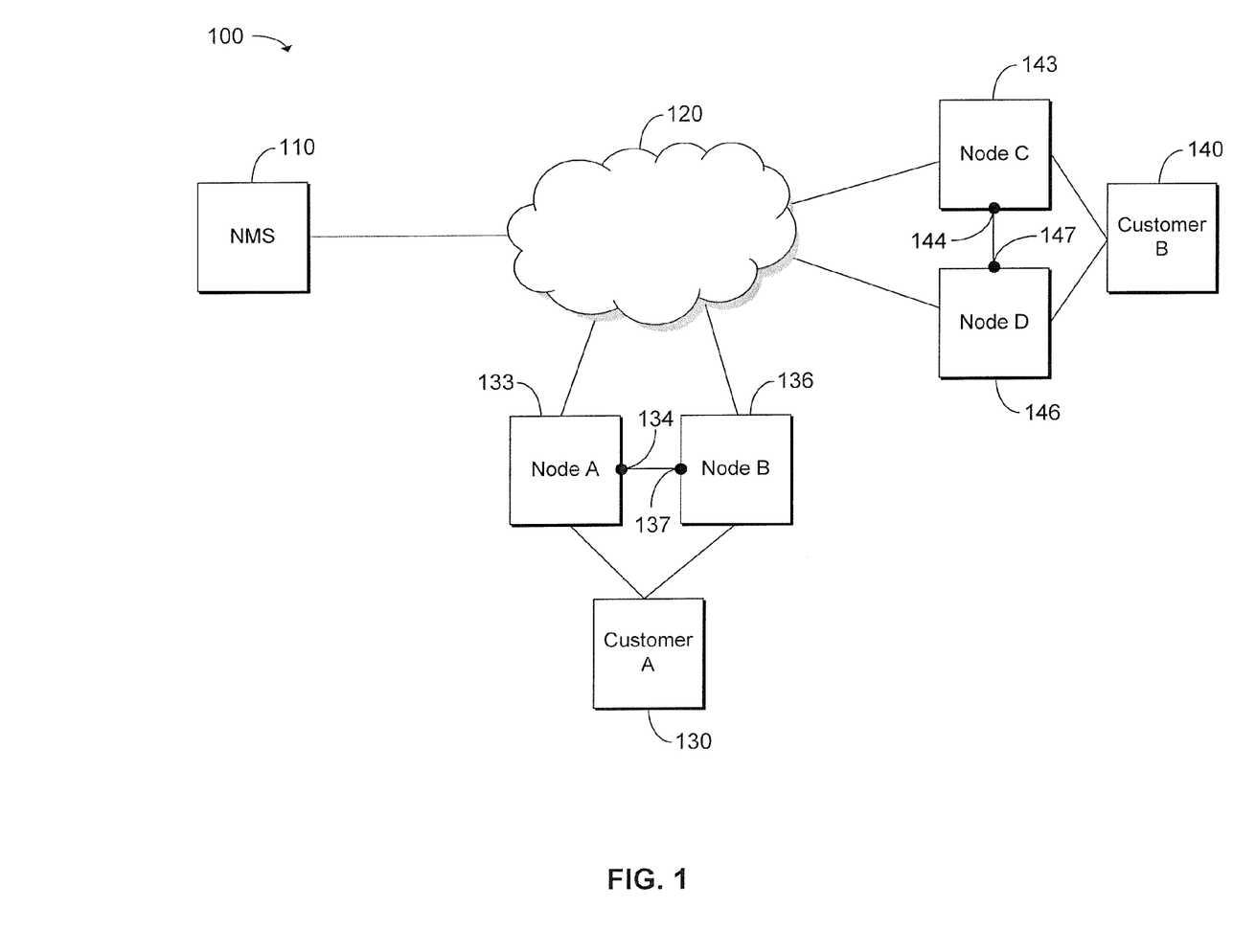
FIG. 1 is a schematic diagram of an exemplary network including a network management system configured to maintain accurate data regarding the topology of the network.

FIG. 1 is a schematic diagram of an exemplary network 100 including a network management system (NMS) 110 configured to maintain data regarding the topology of network 100. Network 100 includes NMS 110, network 120, customer A 130, node A 133, endpoint A 134, node B 136, endpoint B 137, customer B 140, node C 143, endpoint C 144, node D 146, and endpoint D 147.

Network management system 110 may be a machine capable of monitoring and configuring network nodes contained in network 100 through interaction with network operators. For example, NMS 110 may periodically poll network nodes in network 100 to receive updates regarding the status of particular nodes. Alternatively, network nodes in network 100 may automatically send updates regarding their status without receiving a query from NMS 110. It should be apparent that, in this manner, NMS 110 enables an operator to remotely monitor and manage the operation of a number of components contained in network 100. The specific hardware used to implement NMS 110 is described in further detail below in connection with FIG. 2.

Network 120 may be any network for providing services to one or more customers 130, 140. As an example, network 120 may be operated by a service provider and include a plurality of routers, switches, bridges, and other components suitable for receiving and forwarding data to and from customers 130, 140. In this manner, network 120 may provide customers 130, 140 with access to systems in another communication network, such as the Internet (not shown).

Customer A 130 and customer B 140 may each correspond to a user that accesses network 120 through a corresponding network node. Customers 130, 140 may be, for example, home or business users accessing network 120 through a personal or laptop computer, set-top box, or the like. Alternatively, customers 130, 140 may be networks themselves.

Customers 130, 140 access network node 120 through one or more network nodes 133, 136, 143, 146. For example, as illustrated in FIG. 1, customer A accesses network 120 through node A 133 or node B 136, while customer B 140 accesses network 120 through node C 143 or node D 146. Nodes 133, 136, 143, 146 may be routers, switches, or any other networking equipment suitable for forwarding data between network 120 and customers 130, 140.

As illustrated in FIG. 1, node A 133 and node B 136 are both members of a multi-chassis automatic protection switching (APS) pair. In other words, in a typical scenario, node A 133 may serve as a working node, maintaining a working circuit between node A 133 and customer A 130. Similarly, node B 136 may serve as a protecting node, maintaining a protecting circuit between node B 136 and customer A 130. In the event of failure of node A 133, node B 136 may receive notification of the failure transmitted from endpoint 134 in node A 133 to endpoint 137 in node B 136 over a physical link. Node B 136 may then become the working node, such that data transmitted between network 120 and customer A 130 goes through node B 136.

Node C 143 and node D 146 may operate in a similar manner. For example, node C 143 may serve as a working node, while node D 146 may serve as a protecting node. Endpoint 144 in node C 143 may be connected to endpoint 147 in node D 146 over a physical link.

In operation, NMS 110 may obtain a notification from one of the nodes 133, 136, 143, 146 that the particular node contains an endpoint that is a member of a multi-chassis pair. Such a notification may indicate, for example, the address of the corresponding endpoint in the pair. The notification may also include the address of the endpoint or, alternatively, the address of the endpoint may be derived based on the source of the notification. The endpoint addresses may be for example, the Internet Protocol (IP) addresses of the endpoints.

When an endpoint with an address matching the pair endpoint identified in the notification is not found in the storage module of NMS 110, NMS 110 may assume that the endpoint is the first endpoint of the pair discovered in network 100. Thus, NMS 110 may create a multi-chassis container object for storage in the storage module in NMS 110. In particular, NMS 110 may store the IP address of the endpoint and the IP address of the pair endpoint in a storage module in NMS 110.

In various exemplary embodiments, NMS 110 implements functionality that resolves conflicts between endpoints that are paired through the above-described process. To illustrate the problem, assume that endpoint 134 has an IP address of 10.10.10.1, while the corresponding endpoint 137 in the multi-chassis pair has an IP address of 10.10.10.2. Further assume that endpoint 144 also has an IP address of 10.10.10.1, while the corresponding endpoint 147 has an IP address of 10.10.10.2. Such an arrangement is possible, for example, when node A 133 and node B 136 are located in different Open Shortest Path First (OSPF) sub-areas or autonomous systems than node C 143 and node D 146. It should be apparent however, that such arrangements are not limited to the OSPF protocol; rather any protocol may be used, provided that endpoints 134 and 137 cannot communicate with endpoints 144 and 147. One example of such a protocol is the Intermediate System to Intermediate System (IS-IS) protocol.

Suppose NMS 110 first discovers endpoint 134, which identifies 10.10.10.2 as the IP address of the corresponding paired endpoint in the multi-chassis pair. NMS 110 may then create an entry in its storage module indicating that an endpoint 134 with IP address 10.10.10.1 in node A 133 has a currently unidentified pair endpoint at 10.10.10.2. Further suppose that NMS 110 next discovers endpoint 147, which has an IP address of 10.10.10.2 and a paired endpoint with an address of 10.10.10.1. NMS 110, without further knowledge of the topology of the network, may incorrectly associate endpoint 147 of node D 146 with endpoint 134 of node A 133, such that the topology stored by NMS 110 will not reflect the actual arrangement. Furthermore, upon discovery of the correct endpoint 137 of node B 136, NMS 110 would encounter a conflict, as endpoint 137 would also identify its pair endpoint as having IP address 10.10.10.1.

Accordingly, NMS 110 may implement functionality to identify a correct endpoint among multi-chassis objects with conflicting addresses. As an example, NMS 110 may implement Operations, Administration, and Maintenance (OAM) messaging to identify the proper endpoint of the pair. In this example, NMS 110 may first trigger an IP ping message from endpoint 134 to endpoint 137 and endpoint 147 to determine connectivity. If either endpoint failed to respond, NMS 110 could then assume that the responding endpoint is the proper endpoint. If both endpoints responded, NMS 110 could then trigger an IP traceroute or tracepath message from endpoint 134 to endpoint 137 and endpoint 147 to determine the number of hops from endpoint 134 to each endpoint. Based on the assumption that the proper endpoint will be the closest, NMS 110 may then select the endpoint with the fewest number of hops as the proper endpoint.

It should be apparent that the above-described example is intended to provide an overview of the functionality of NMS 110 and is a simplification in some respects. Further details regarding the operation of NMS 110 will be provided below with reference to FIGS. 2-4.

It should be also apparent that, although illustrated in FIG. 1 as implementing multi-chassis APS, NMS 110 may resolve endpoint conflicts between endpoints implementing any multi-chassis functionality. For example, network 100 may implement multi-chassis link aggregation groups (MC-LAG) and multi-chassis ring topologies. Other suitable alternatives will be apparent to those of skill in the art.

Figure 2:
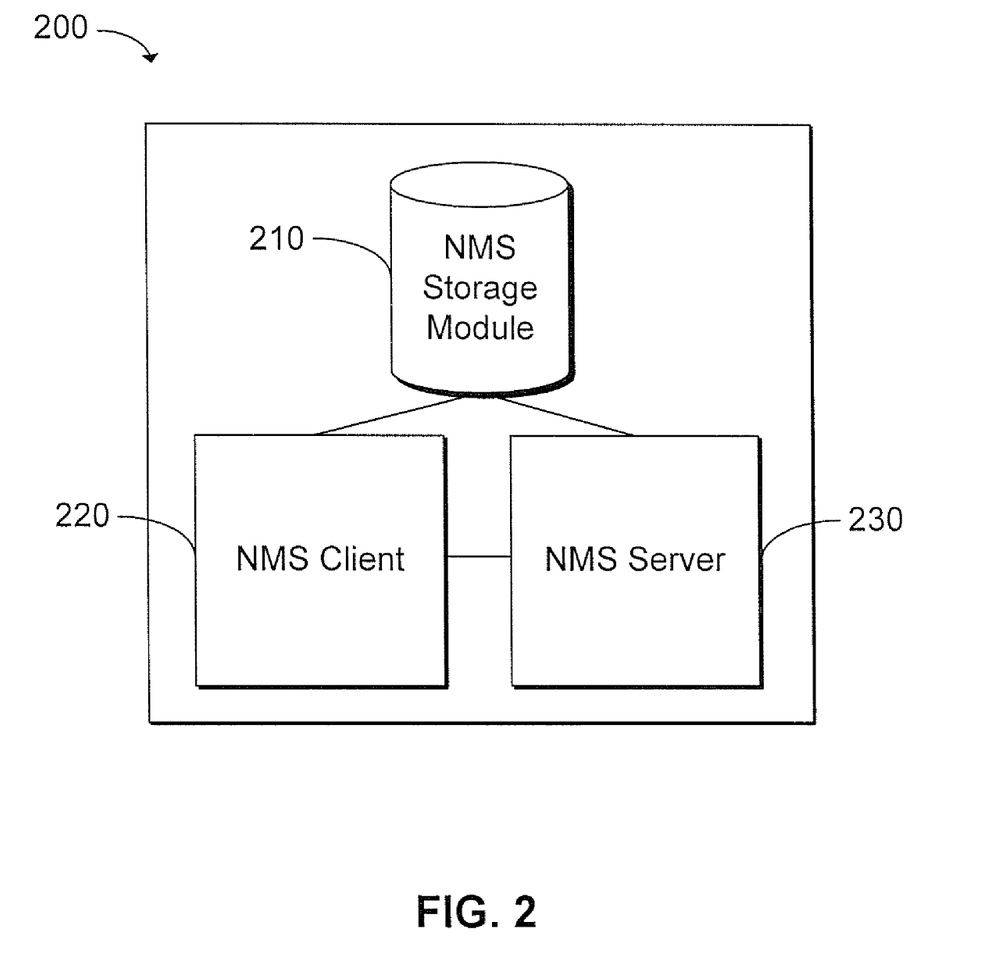
FIG. 2 is a schematic diagram of an exemplary network management system for use in the network of FIG. 1.

FIG. 2 is a schematic diagram of an exemplary NMS 200 for use in network 100 of FIG. 1. In particular, NMS 200 of FIG. 2 may correspond to NMS 110 of FIG. 1. NMS 200 may include NMS storage module 210, NMS client 220, and NMS server 230.

NMS storage module 210 may be a machine-readable medium that stores information representing the topology of a network and the status of the network nodes contained within the network. Storage module 210 may, for example, store information regarding multi-chassis objects, including information about endpoints, their IP addresses, and their corresponding pair endpoints. Other suitable information for storage in storage module 210 will be apparent to those of ordinary skill in the art.

NMS client 220 may be a combination of hardware and/or machine-executable instructions encoded on a machine-readable memory configured to manage the interaction of an operator with NMS 200. NMS client 220 may further include input devices, such as a keyboard, and output devices, such as a monitor. NMS client 220 may be configured to display a graphical user interface (GUI) to an operator, the GUI detailing the network topology, alarms raised in the network, and similar information. Furthermore, in embodiments requiring operator selection of multi-chassis pairings upon identification of a conflict, NMS client 220 may be configured to display potential endpoint pairings with results of the OAM operations, then receive a selection of the appropriate pairings from the operator.

NMS server 230 may be a combination of hardware and/or machine-executable instructions encoded on a machine-readable memory configured to implement the discovery and conflict-resolution functionality of NMS 200. Thus, NMS server 230 may include, for example, a conventional microprocessor, a Field Programmable Gate Array (FPGA), instruction-encoded memory, and any other machine components that will be apparent to those of skill in the art. According to various exemplary embodiments, NMS server 230 may include functionality for identifying a proper pairing among multi-chassis endpoints with conflicting addresses. This functionality is described in further detail below with reference to FIGS. 3 and 4.

Figure 3:
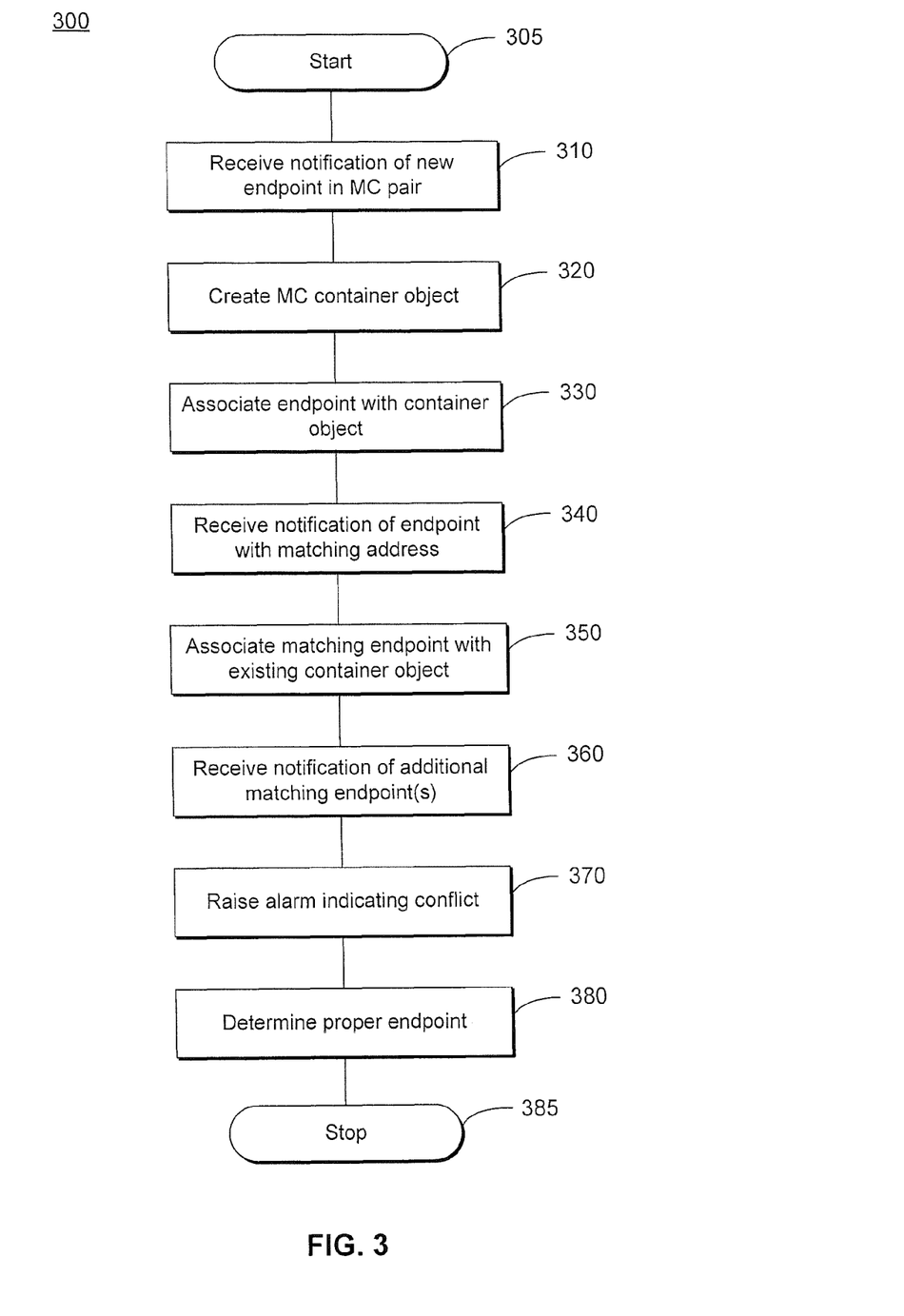
FIG. 3 is a flowchart of an exemplary method for maintaining and updating data regarding multi-chassis pairs in the network.

FIG. 3 is a flowchart of an exemplary method 300 for maintaining and updating data regarding multi-chassis pairs in the network. Exemplary method 300 may be executed by, for example, NMS 200. Although the steps of method 300 are described below as executed by primarily NMS server 220, other suitable components for execution of method 300 will be apparent to those of skill in the art.

Method 300 starts in step 305 and proceeds to step 310, where NMS server 220 may receive a notification of a new endpoint in a multi-chassis pair. In particular, NMS server 220 may receive a message from an endpoint in a multi-chassis pair in response to a query by NMS server 220. Alternatively, the nodes in the network may periodically or otherwise inform NMS server 220 of the existence of an endpoint in a multi-chassis pair.

After NMS server 220 receives a notification of a new endpoint in step 310, method 300 proceeds to step 320, where NMS server 220 may create a multi-chassis container object for storage in NMS storage module 210 to maintain data representing the multi-chassis pair. The container object may be any data construct suitable for maintenance of data and may include space for an address of each node in the pair.

After creating the object in step 320, method 300 proceeds to step 330, where NMS server 220 may associate the endpoint with the multi-chassis container object. In particular, NMS server 220 may store the information received from the endpoint in the appropriate location in NMS storage module 210. Again, this information may include, for example, the address of the endpoint and the address of the endpoint's pair in the multi-chassis interface.

Method 300 then proceeds to step 340, where NMS server 220 receives notification of a multi-chassis endpoint with an address matching the pair endpoint specified in the multi-chassis container object. Because this endpoint is the first matching endpoint identified by NMS server 220, method 300 then proceeds to step 350, where NMS server 220 associates the matching endpoint with the appropriate multi-chassis container object in NMS storage module 210. Method 300 then proceeds to step 360.

In step 360, NMS server 220 receives notification of one or more additional multi-chassis endpoints with an address that matches one of the endpoints in the pair stored in step 350. In this situation, NMS server 220 may determine that a conflict has arisen between multiple nodes and that action is required to resolve the conflict.

Accordingly, method 300 proceeds to step 370, where NMS server 220 may trigger an alarm notifying an operator that a conflict has arisen. In particular, NMS server 220 may trigger display of an alarm to the operator on the GUI of NMS client 210. The GUI displayed on NMS client 210 may present the user with an interface element providing the operator with the option of resolving the conflict between the endpoints. For example, NMS client 210 could display a GUI including a button that, when clicked by the operator, triggers the conflict-resolution procedure.

It should be apparent that although a user may be presented with an option to resolve the conflict, method 300 is not limited to such embodiments. As an alternative, method 300 may automatically initiate the conflict resolution procedure without interaction from the user.

Method 300 then proceeds to step 380, where NMS server 220 initiates a procedure to determine the proper endpoint of the multi-chassis pair. Exemplary processing performed in this step is described in further detail below with reference to FIG. 4. After determining the proper endpoint to resolve the conflict, method 300 proceeds to step 385, where method 300 stops.

Figure 4:
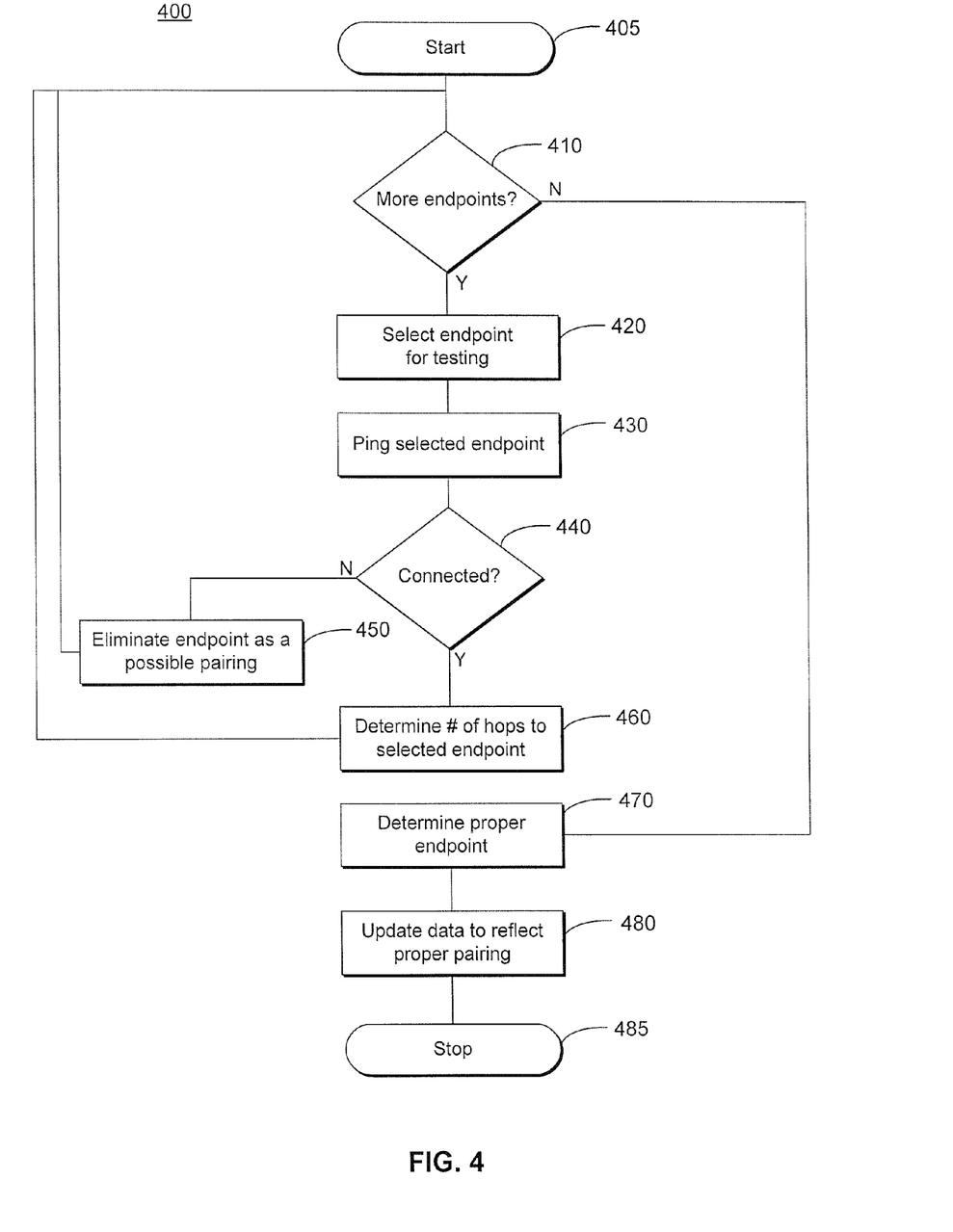
FIG. 4 is a flowchart of an exemplary method for determining a proper endpoint belonging to a multi-chassis pair.

FIG. 4 is a flowchart of an exemplary method 400 for determining a proper endpoint belonging to a multi-chassis pair. Method 400 may correspond to the processing performed in step 380 of method 300 to resolve a conflict between two or more endpoints with the same address. Method 400 may be executed by, for example, NMS 200. Although the steps of method 400 are described below as executed by NMS server 220, other suitable components for execution of method 400 will be apparent to those of skill in the art.

Method 400 starts in step 405 and proceeds to decision step 410, where NMS server 220 may determine whether there are additional conflicting endpoints to be tested. When there are no more endpoints to be tested (i.e., all endpoints have been tested), method 400 proceeds to step 470, described in further detail below. Alternatively, when it is determined that there are additional endpoints to test, method 400 proceeds to step 420.

In step 420, NMS server 220 may select a particular endpoint for testing from the endpoints that have yet to be tested. In particular, NMS server 220 may select an endpoint for which NMS server 220 must determine whether the selected endpoint should be paired with an existing endpoint of a multi-chassis pair.

Method 400 then proceeds to step 430, where NMS server 220 may perform a test to determine the connectivity from the existing endpoint of the multi-chassis pair to the selected conflicting endpoint. As an example, NMS server 220 may initiate an IP ping operator to determine whether the conflicting endpoint responds to queries by the existing endpoint. Other suitable operations for determining connectivity other than the IP ping operation will be apparent to those of skill in the art.

After performing the connectivity test in step 430, method 400 proceeds to step 440, where NMS server 220 may determine whether the conflicting endpoint responded to queries from the existing endpoint. When it is determined that the conflicting endpoint did not respond to the connectivity test, method 400 proceeds to step 450, where NMS server 220 eliminates the conflicting endpoint as a possible pairing with the existing endpoint. In particular, because there is no connectivity between the two endpoints, NMS server 220 will assume that the endpoints cannot be members of the same multi-chassis pair. Method 400 then returns to step 410, where NMS server 220 checks for additional endpoints to be tested.

Alternatively, when, in step 440, NMS server 220 determines that there is connectivity between the two endpoints, method 400 proceeds to step 460. In step 460, NMS server 440 may determine the number of hops from the existing endpoint to the conflicting endpoint. For example, NMS server 220 may initiate an IP traceroute or tracepath message from the existing endpoint to the conflicting endpoint, the traceroute or tracepath message returning the total number of hops between the two endpoints. Other suitable messages for determining the number of hops will be apparent to those of skill in the art. NMS server 220 may store the resulting value for future use in storage module 210 or in temporary memory. Method 400 then returns to step 410, where NMS server 220 checks for additional endpoints to be tested.

After a determination that there are no more endpoints to be tested in decision step 410, method 400 proceeds to step 470. In step 470, NMS server 220 uses the results from the connectivity test in step 430 and the number of hops test in step 460 to determine the proper endpoint for inclusion in the multi-chassis pair. In particular, NMS server 220 may automatically select the connected endpoint with the lowest number of hops as the proper endpoint to be associated with the existing endpoint. Alternatively, NMS server 220 may display an interface on NMS client 210 including the connectivity and/or number of hops test results for each conflicting endpoint, then receive a selection of the proper endpoint from the operator.

After determining the proper endpoint, method 400 proceeds to step 480, where NMS server 220 updates the data maintained in NMS storage module 210 to reflect the proper endpoint in the container object or similar data record. In particular, NMS server 220 may ensure that the existing endpoint is properly paired with the endpoint identified as the correct pair endpoint in step 470. NMS server 220 may then use the remaining peer(s) as the base for a new multi-chassis container object. In this situation, the end result would be a multi-chassis object with a proper pairing and an additional multi-chassis object with only one peer. Method 400 then proceeds to step 485, where method 400 stops.

It should be apparent that, although method 400 is described above as initially performing a connectivity test to eliminate possible endpoints, this step is not performed in some embodiments. In particular, method 400 may skip steps 430, 440, and 450, such that the only test performed is the number of hops test. In such cases, NMS server 220 may identify non-connected endpoints from the number of hops test, as the number of hops test will indicate that the test failed.

According to the foregoing, various exemplary embodiments enable a network management system to maintain network information accurately reflecting the arrangement of the network. In particular, when the network includes multi-chassis endpoints with conflicting addresses, various exemplary embodiments enable the network management system to resolve the conflicts and select the proper endpoint. Such embodiments enable a quick and accurate determination of the network topology with minimal to no operator interaction.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a network node (e.g. router or switch). Thus, a machine-readable storage medium may include read-only memory (ROM), random-access memory (RAM), magnetic disk storage media, optical storage media, flash-memory devices, and similar storage media.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications may be implemented while remaining within the spirit and scope of the invention. Accordingly, the foregoing disclosure, description, and figures are for illustrative purposes only and do not in any way limit the invention, which is defined only by the claims.

What is claimed is:

1. A network management system for monitoring a network and maintaining an accurate representation of a topology of the network, the network management system comprising:
   a storage module that maintains data representing the topology of the network; and
   a network management system server, including a processor, configured to:
      receive a notification of a new endpoint discovered in the network, the new endpoint representing an endpoint in a multi-chassis pair,
      determine that an address of the new endpoint conflicts with an address of a first existing endpoint of an existing multi-chassis pair, wherein the first existing endpoint is currently paired with a second existing endpoint,
      determine whether the new endpoint or the first existing endpoint is a proper endpoint of the existing multi-chassis pair, and
      when the new endpoint is the proper endpoint of the existing multi-chassis pair, update the data representing the topology in the storage module to replace the first existing endpoint with the new endpoint as paired with the second existing endpoint.

2. The network management system of claim 1, wherein, upon determining that the address of the new endpoint conflicts with the address of the first existing endpoint of the existing multi-chassis pair, the network management system server is further configured to:
   raise an alarm, the alarm notifying a user that there is a conflict between the new endpoint and the first endpoint of the existing multi-chassis pair.

3. The network management system of claim 2, wherein the network management system is further configured to:
  display an interface element on a graphical user interface accessible to the user, wherein activation of the interface element by the user triggers a procedure to determine whether the new endpoint or the first existing endpoint is the proper endpoint of the existing multi-chassis pair.

4. The network management system of claim 1, wherein, to determine whether the new endpoint or the first existing endpoint is the proper endpoint of the existing multi-chassis pair, the network management system server is further configured to:
  perform a first ping operation, the first ping operation determining connectivity from the second existing endpoint to the first existing endpoint, and
  perform a second ping operation, the second ping operation determining connectivity from the second existing endpoint to the new endpoint.

5. The network management system of claim 4, wherein the network management system server is further configured to:
  determine that the first existing endpoint is not the proper endpoint of the existing multi-chassis pair when there is no connectivity from the second existing endpoint to the first existing endpoint, and
  determine that the new endpoint is not the proper endpoint of the existing multi-chassis pair when there is no connectivity from the second existing endpoint to the new endpoint.

6. The network management system of claim 1, wherein, to determine whether the new endpoint or the first existing endpoint is the proper endpoint of the existing multi-chassis pair, the network management system server is further configured to:
  perform a first trace operation to determine a number of hops from the second existing endpoint to the first existing endpoint, and
  perform a second trace operation to determine a number of hops from the second existing endpoint to the new endpoint.

7. The network management system of claim 6, wherein the network management system server is further configured to:
  automatically select an endpoint with a lowest number of hops as the proper endpoint of the existing multi-chassis pair.

8. The network management system of claim 6, wherein the network management system server is further configured to:
  display an interface including the number of hops from the second existing endpoint to the first existing endpoint and the number of hops from the second existing endpoint to the new endpoint, and
  receive a user selection of either the first existing endpoint or the new endpoint, the user selection indicating the proper endpoint of the existing multi-chassis pair.

9. The network management system of claim 1, wherein the existing multi-chassis pair operates according to a protocol selected from the group consisting of Multi-Chassis Automatic Protection Switching (MC-APS) and Multi-Chassis Link Aggregation Grouping (MC-LAG).

10. The network management system of claim 1, wherein the new endpoint and the first existing endpoint are assigned the same Internet Protocol (IP) address in different Open Shortest Path First (OSPF) or Intermediate System to Intermediate System (IS-IS) areas.

11. A method performed by a network management system for monitoring a network and maintaining an accurate representation of a topology of the network, the method comprising:
  maintaining data representing the topology of the network in a storage module in the network management system;
  receiving a notification of a new endpoint discovered in the network, the new endpoint representing an endpoint in a multi-chassis pair;
  determining that an address of the new endpoint conflicts with an address of a first existing endpoint of an existing multi-chassis pair, wherein the first existing endpoint is currently paired with a second existing endpoint;
  determining whether the new endpoint or the first existing endpoint is a proper endpoint of the existing multi-chassis pair; and
  when the new endpoint is the proper endpoint of the existing multi-chassis pair, updating the data representing the topology in the storage module to replace the first existing endpoint with the new endpoint as paired with the second existing endpoint.

12. The method of claim 11, wherein, upon determining that the address of the new endpoint conflicts with the address of the first existing endpoint of the existing multi-chassis pair, the method further comprises:
  raising an alarm, the alarm notifying a user that there is a conflict between the new endpoint and the first endpoint of the existing multi-chassis pair.

13. The method of claim 12, the method further comprising:
  displaying an interface element on a graphical user interface accessible to the user, wherein activation of the interface element by the user triggers a procedure to determine whether the new endpoint or the first existing endpoint is the proper endpoint of the existing multi-chassis pair.

14. The method of claim 11, wherein, in determining whether the new endpoint or the first existing endpoint is the proper endpoint of the existing multi-chassis pair, the method further comprises:
  performing a first ping operation, the first ping operation determining connectivity from the second existing endpoint to the first existing endpoint; and
  performing a second ping operation, the second ping operation determining connectivity from the second existing endpoint to the new endpoint.

15. The method of claim 14, the method further comprising:
  determining that the first existing endpoint is not the proper endpoint of the existing multi-chassis pair when there is no connectivity from the second existing endpoint to the first existing endpoint; and
  determining that the new endpoint is not the proper endpoint of the existing multi-chassis pair when there is no connectivity from the second existing endpoint to the new endpoint.

16. The method of claim 11, wherein, in determining whether the new endpoint or the first existing endpoint is the proper endpoint of the existing multi-chassis pair, the method further comprises:
  performing a first trace operation to determine a number of hops from the second existing endpoint to the first existing endpoint; and
  performing a second trace operation to determine a number of hops from the second existing endpoint to the new endpoint.

17. The method of claim 16, the method further comprising:
  automatically selecting an endpoint with a lowest number of hops as the proper endpoint of the existing multi-chassis pair.

18. The method of claim 16, the method further comprising:
  displaying an interface including the number of hops from the second existing endpoint to the first existing endpoint and the number of hops from the second existing endpoint to the new endpoint; and
  receiving a user selection of either the first existing endpoint or the new endpoint, the user selection indicating the proper endpoint of the existing multi-chassis pair.

19. The method of claim 11, wherein the existing multi-chassis pair operates according to a protocol selected from the group consisting of Multi-Chassis Automatic Protection Switching (MC-APS) and Multi-Chassis Link Aggregation Grouping (MC-LAG).

20. The method of claim 11, wherein the new endpoint and the first existing endpoint are assigned the same Internet Protocol (IP) address in different Open Shortest Path First (OSPF) or Intermediate System to Intermediate System (IS-IS) areas.

* * * * *

UNITED STATES PATENT AND TRADEMARK OFFICE
CERTIFICATE OF CORRECTION

| | | |
|---|---|---|
| PATENT NO. | : 8,041,811 B2 | Page 1 of 1 |
| APPLICATION NO. | : 12/427539 | |
| DATED | : October 18, 2011 | |
| INVENTOR(S) | : Joel R. Calippe, Ashok Sadasivan and Claudio A. Ortega | |

It is certified that error appears in the above-identified patent and that said Letters Patent is hereby corrected as shown below:

On the Title Page of the patent, item (75): under "Inventors", please change the inventor name "Ashok Sadaivan" to --Ashok Sadasivan--.

Signed and Sealed this
Sixth Day of December, 2011

David J. Kappos
*Director of the United States Patent and Trademark Office*